United States Patent [19]

Bloomer

[11] Patent Number: 4,488,199

[45] Date of Patent: Dec. 11, 1984

[54] PROTECTION CIRCUIT FOR CAPACITIVE BALLAST

[75] Inventor: Milton D. Bloomer, Scotia, N.Y.

[73] Assignee: General Electric Company, Schenectady, N.Y.

[21] Appl. No.: 424,126

[22] Filed: Sep. 27, 1982

[51] Int. Cl.³ .............................................. H02H 3/08
[52] U.S. Cl. ...................................... 361/93; 361/101
[58] Field of Search ...................... 361/58, 93, 94, 92, 361/100, 101, 16, 15; 307/354, 126; 315/240

[56] References Cited

FOREIGN PATENT DOCUMENTS 2101343  7/1972  Fed. Rep. of Germany ...... 307/354
483789  12/1975  U.S.S.R. ................................. 361/93

OTHER PUBLICATIONS

"Zero-Crossing Detector Circuits"—Armstrong Mullard Technical Communications, No. 132, 10/1976.

*Primary Examiner*—Harry E. Moose, Jr.
*Attorney, Agent, or Firm*—Geoffrey H. Krauss; James C. Davis, Jr.; Marvin Snyder

[57] ABSTRACT

A protection circuit for a capacitively ballasted load provides decreased load current in the event of a circuit arc. The A.C. load current is measured at a time shortly after a load current zero crossing; if a non-zero load current is present, the load is operating normally and no action is taken, whereas if the load current remains at an essentially zero magnitude, indicative of circuit arcing conditions, normal load operation is inhibited.

14 Claims, 4 Drawing Figures

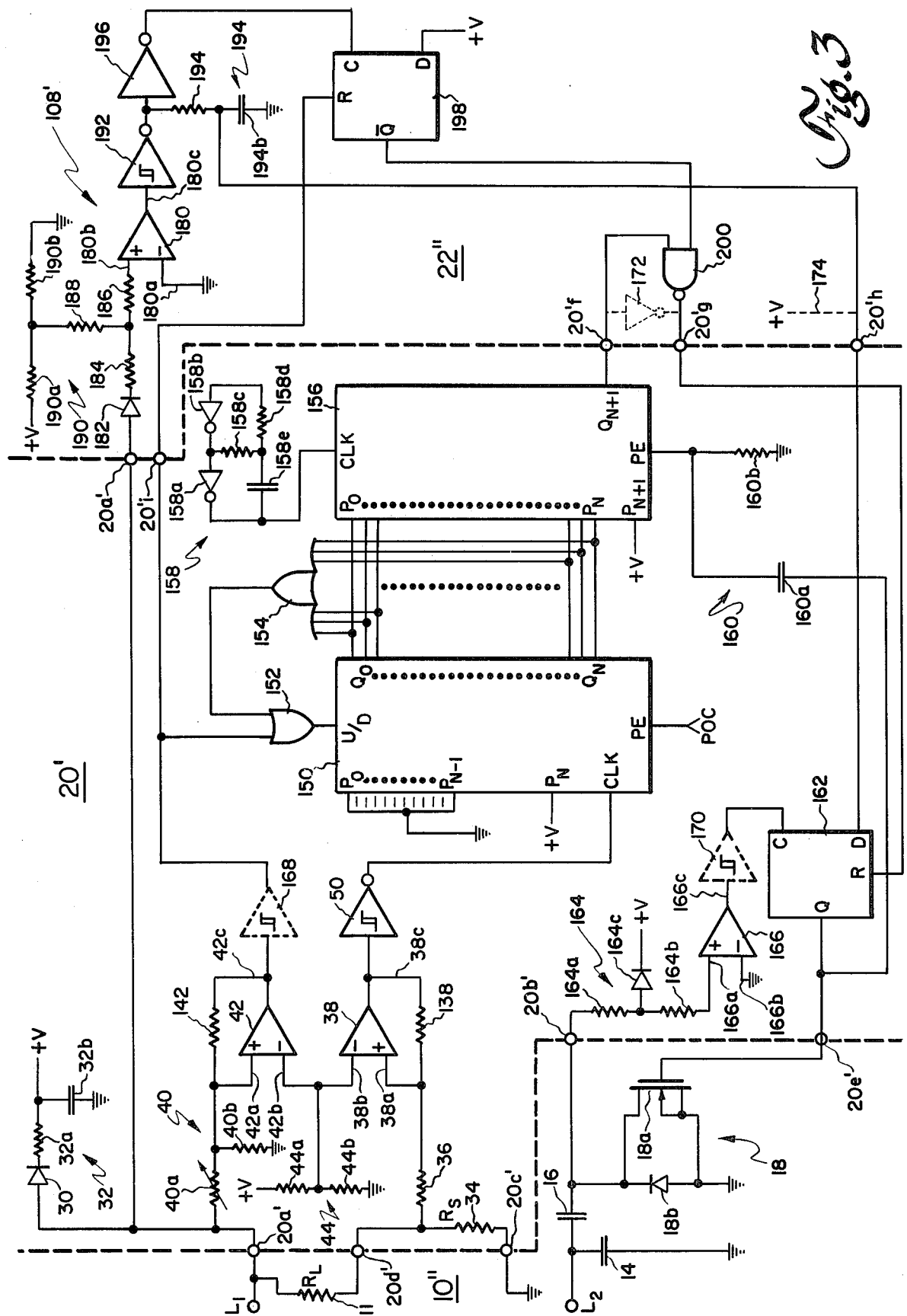

PROTECTION CIRCUIT FOR CAPACITIVE BALLAST

BACKGROUND OF THE INVENTION

The present application is directed to load ballasts and, more particularly, to a novel protection circuit for reducing load current in the event of arc-like conditions in a capacitive ballast or associated load.

It is known to control loads by means of a powercontrolling ballast. Typically, a variable ballasting impedance is placed in series with a load, such as in the capacitive ballast described and claimed in co-pending U.S. patent application Ser. No. 379,393, filed May 18, 1982, now U.S. Pat. No. 4,447,764, assigned to the assignee of the present invention and incorporated herein in its entirety by reference. A capacitive ballast may be used with load resistance control circuitry, such as described and claimed in co-pending U.S. patent application Ser. No. 382,875, filed May 28, 1982, now U.S. Pat. No. 4,421,993, also assigned to the assignee of the present invention and incorporated herein in its entirety by reference. However, the load resistance control circuitry does not protect the capacitive ballast, or the associated load, from adverse effects of an arc, or arc-like, condition occurring in the power circuit. These arcs may be obtained from a poor connection to the energizing source or improper action in a circuit-controlling switch and the like. Typically, if an arc-like condition has occurred during a power source line cycle, the arc-like condition will continue until a natural zero crossing of the line and load current, at which natural zero crossing point the arc will extinguish but will leave a highly ionized gap. In a capacitive ballast, the capacitor voltage lags the current substantially by 90°, whereby the capacitor voltage is at a line peak at the moment the arc extinguishes, and tends to remain at the peak level. When the line voltage falls from this peak level in a sinusoidal manner, the potential across a highly ionized gap, caused by the arc-like condition, increases until a breakdown potential is reached, at which potential the arc is itself reestablished. The energy stored in the capacitor of the ballast is suddenly dumped into the load and is limited only by the load resistance. Therefore, with a reignition time of about one-half cycle, maximum energy transfer to the load occurs and the load, or a portion of the ballast, may be instantly destroyed. It is therefore highly desirable that these destructive currents be eliminated or reduced by detection of the occurrence of an arc, and by providing suitable means for reducing the energy available from the ballasting capacitance under such conditions.

BRIEF SUMMARY OF THE INVENTION

In accordance with the invention, the magnitude of current flowing through a load is sampled shortly after a load current zero crossing, to determine if an arc-like condition exists. If the sampled current shortly after the load zero crossing is of non-zero magnitude, the load is operating under normal conditions and protective action is not taken. In the event that the sampled current is of substantially zero magnitude, an arc-like condition is assumed to have occurred, and protective action is enabled within the capacitive ballast to prevent potential destruction of the ballast and/or the associated load.

In presently preferred embodiments, in which the ballast includes a main capacitive element always in series with the load and an auxiliary capacitive element selectively placed in parallel with the main capacitive element by action of a switching means, actuated for a portion of a powerline cycle selected to maintain the current through the load at a constant value, detection of an arc-like condition is utilized to prevent conduction of the switching device, whereby the current through the load and the capacitive ballast is limited to the minimum circuit current established by the value of the main ballasting capacitance.

Accordingly, it is an object of the present invention to provide a novel circuit for protecting a capacitive ballast and the load thereto in the event of arc-like conditions.

This and other objects of the present invention will become apparent upon consideration of the following detailed description, when read in conjunction with the drawings.

BRIEF DESCRIPTION OF THE DRAWINGS

FIG. 3 is a schematic diagram of a ballast implemented with digital logic, and of another presently preferred embodiment of my novel protection circuit for use therewith.

DETAILED DESCRIPTION OF THE INVENTION

Figure 1:
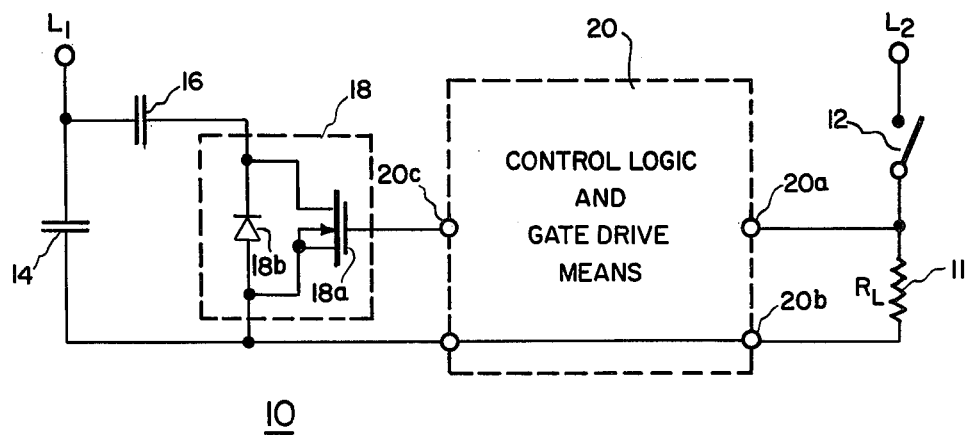
FIG. 1 is a schematic block diagram of a load and a capacitive ballast therefor.

Referring initially to FIG. 1, a capacitive power-controlling ballast 10 is utilized with a load resistance 11 of magnitude $R_L$. A switching means 12 is connected in series with load 11 and with a first capacitive element 14 of the ballast between a pair of line terminals $L_1$ and $L_2$. As described in detail in the aforementioned U.S. patent application Ser. No. 379,393, filed May 18, 1982, a second capacitive element 16 is placed in series with a switching means 18 across first capacitor 14. Switching means 18 includes a controlled-conduction device 18a, such as a power MOSFET and the like, having a unidirectionally-conducting element 18b, such as the diode and the like, in parallel connection therewith. A control logic and gate drive means 20 receives a signal at a first input 20a, connected to the mains side of load 11, signal with respect to control means common 20b. The control means provides a signal at output 20c to control device 18a. Capacitors 14 and 16 provide a variable ballasting impedance in series with the load; capacitor 14 is always in series with the load and provides a maximum ballasting impedance, while capacitor 16 is connected in parallel with capacitor 14 for an adjustable fraction of the line cycle. When switching means 18 remains closed for an entire cycle, a minimum ballasting impedance is presented to the load. If an arc occurs in a power circuit, such as obtains from a poor lamp socket connection or a nonsnap-action switching means 12, the load 11 (such as an incandescent lamp and the like) can be instantly destroyed. Often, the solid-state switching device 18a is also instantly destroyed responsive to an arc condition.

Figure 2A:
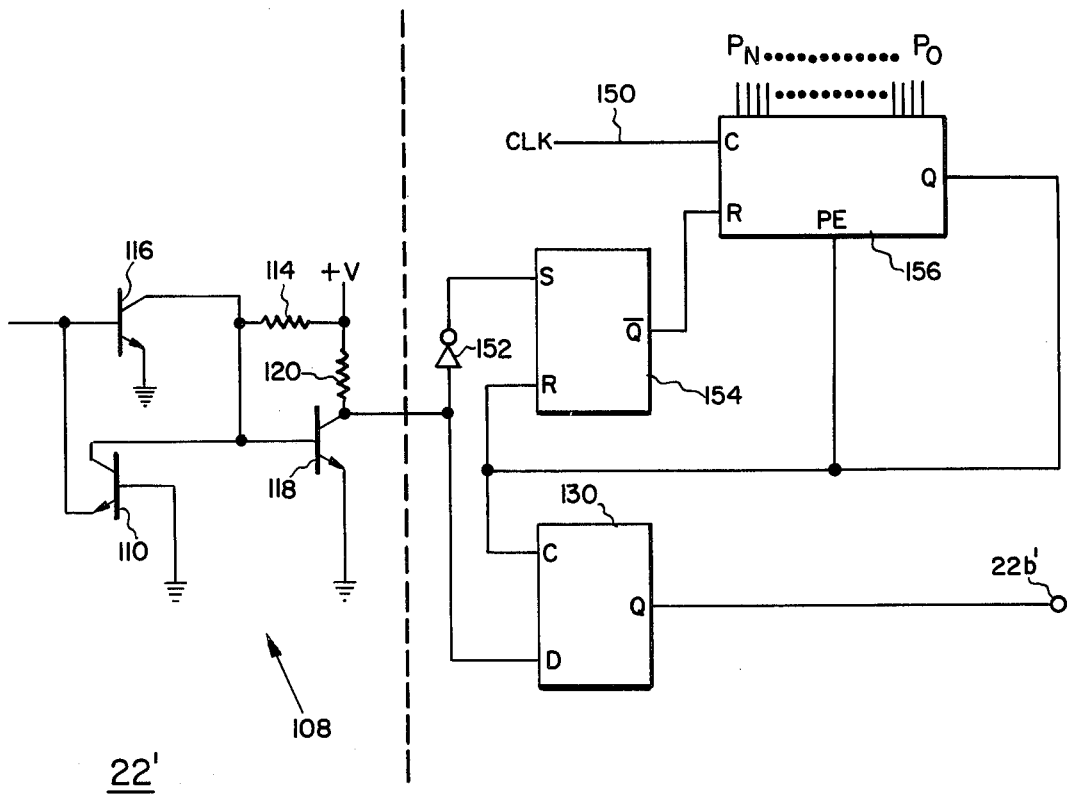
FIG. 2a is a schematic diagram of an alternative embodiment of protection circuit for use in the embodiment of FIG. 2.
Figure 2:
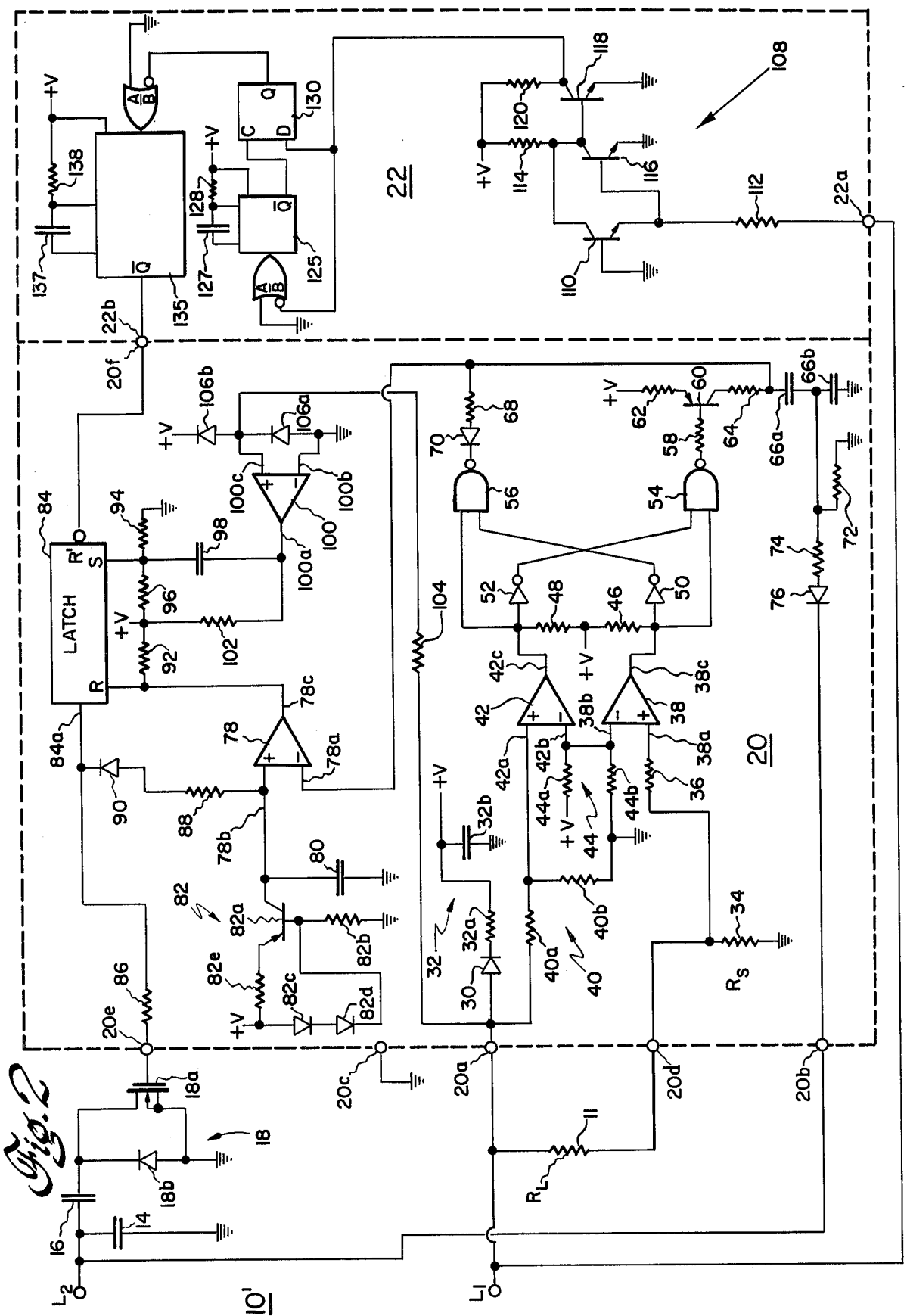
FIG. 2 is a schematic diagram of one embodiment of a capacitive ballast and of my protection circuit therefor, in accordance with the principles of the present invention.

Referring now to FIG. 2, wherein like reference designations are utilized for like elements, a protection section circuit 22 is utilized with control means 20 to prevent destruction of switching device 18a and/or load 11. The control logic and gate drive means 20, as more fully described and claimed in U.S. application Ser. No. 382,875, filed May 28, 1982, incorporated herein by reference in its entirety, includes a first input terminal 20a connected to a first mains line $L_1$ and a second input terminal 20b connected to the other mains line $L_2$. A rectifier 30, in conjunction with a power supply filter 32 (comprising a series resistance 32a and a shunt filter capacitance 32b) provides a source of positive operating potential $+V$, with respect to common terminal 20c, connected to circuit common. The load resistance 11 is connected between first input 20a and an auxiliary input 20d. A sensing resistance $R_S$ element 34 is connected from auxiliary input 20d to circuit common 20c. Resistance 34 provides a voltage thereacross proportional to the load current; this voltage is coupled through a resistance 36 to the non-inverting input 38a of a first comparator 38. The voltage across the load, at input 20a, is connected through a voltage divider 40 (comprising a series resistance element 40a and a shunt resistance element 40b) to the non-inverting input 42a of another comparator 42. The inverting inputs 38b and 42b of comparators 38 and 42, respectively, are connected together to a reference potential at the tap of another voltage divider 44, comprised of first and second resistance elements 44a and 44b connected between operating potential $+V$ and common potential. The outputs 38c and 42c of comparators 38 and 42, respectively, are connected through respective pullup resistors 46 and 48 to positive operating potential, and are also individually connected to the input of an associated one of inverters 50 and 52. One input of a first two-input NAND gate 54 is connected to first comparator output 38c and to the output of second inverter 52. One input of a second NAND gate 56 is connected to second comparator output 42c, while the other input is connected to the output of inverter 50. The output of gate 54 is connected through a biasing resistance 58 to the base electrode of a PNP transistor 60, having its emitter electrode connected through another resistance 62 to positive operating potential $+V$. The collector electrode of transistor 60 is connected through a resistance 64 to a pair of series-connected integrating capacitors 66a and 66b. The integrating capacitors are also connected through a resistance 68 and a diode 70 to the output of gate 56. The junction between capacitors 66a and 66b are connected to common potential through a resistance 72 and are also connected through a series resistance 74 and diode 76 to control means second mains line input 20b. The junction between resistors 64 and 68 and capacitor 66a is connected to the inverting input 78a of another comparator 78. The non-inverting input 78b thereof is connected to a ramping capacitor 80 receiving a constant current from a constant current source 82. The constant current source includes a PNP transistor 82a having its collector electrode connected to capacitor 80. The base electrode of transistor 82a is connected to ground potential through a resistance 82b and to positive operating potential through a pair of diodes 82c and 82d. The emitter electrode of transistor 82a is connected to operating potential $+V$ through a current-setting resistance 82e. The output 78c of the third comparator is connected to a first resetting input R of a latch means 84. The latch means output 84a is connected through a resistance 86 to control means output 20e and thence to the gate electrode of switching device 18a. A resistance element 88 and series diode 90 are connected between third comparator input 78b and latch output 84a. The latch reset R input is also connected to operating potential $+V$ through another resistance element 92. A set S input of latch 84 is connected to common potential through a resistance 94 and to operating potential $+V$ through a resistance 96. The set input is also connected through a capacitor 98 to the output 100a of a fourth comparator 100. Comparator output 100a is also connected to operating potential $+V$ to a pull-up resistor 102. The comparator inverting input 100b is connected to common potential while the non-inverting input 100c thereof is connected through a resistor 104 to control means first input 20a. One of a pair of protection diodes 106a and 106b is connected from input 100c respectively to common and operating potentials.

In accordance with the invention, the protection circuit 22 has a first input 22a receiving the first mains line $L_1$ voltage, and has an output 22b connected to another input 20f of the control means circuit and thence to a second latch reset R' input of latch means 84. Protection circuit 22 includes a zero crossing detector 108 having a first transistor 110 with the base electrode thereof connected to common potential, the emitter electrode thereof connected through a resistance 112 to input 22a and a collector electrode connected through a load resistance 114 to positive operating potential $+V$. The emitter electrodes of second and third transistors 116 and 118 are connected to common potential, with the collector electrode of transistor 116 and the base electrode of transistor 118 being connected to the junction between resistor 114 and the collector electrode of transistor 110. The base electrode of transistor 116 is connected to the emitter electrode of transistor 110. The collector electrode of transistor 118 is connected through an output resistance 120 to operating potential $+V$. The collector electrode of transistor 118 is also connected to the $\overline{B}$ input of a first monostable multivibrator means 125, having the A input thereof connected to ground potential. A timing capacitance 127 and timing resistance 128 are connected to means 125 to establish the output pulse duration thereof. The $\overline{Q}$ output of monostable multivibrator means 125 is connected to the clock C input of a D-type flip-flop logic element 130, having the data D input thereof connected to the collector electrode of transistor 118. The true Q output of flip-flop 130 is connected to the $\overline{B}$ input of a second monostable multivibrator 135. The A input of multivibrator 135 is connected to ground potential, while timing capacitive element 137 and resistor timing element 138 are connected thereto to establish the duration of the pulse at the $\overline{Q}$ output thereof. The $\overline{Q}$ output is connected to protection circuit output 22b and thence to latch second reset R' input of latch means 84 in the control means 20. Monostable multivibrators 125 and 135 may be integrated circuit types, such as provided by the commonly available 4528 CMOS integrated circuit and the like.

Briefly, in operation, control means 20 senses the current flowing through load 11 and the voltage across load 11 to charge or discharge capacitors 66, to establish the time at which the voltage at one input of comparator 78 is equal to the ramp voltage at the other input. Latch 84 is set by comparator 100 at a line-voltage zero crossing and reset when the integrating capacitive voltage is equal to the ramp voltage, thus establishing the time interval during which current flows through capacitor 16 and hence the load current and resistance.

In the event of an arc, a low-voltage lamp utilized as load 11 will survive if (1) the ratio of capacitances 14 and 16 is about 1:1 and (2) the control-conduction device 18a is shut off to reduce the arcing current flowing through the load. This is accomplished by protection circuit 22. Under normal operating conditions, each time the current through load 11 passes through zero magnitude, in either direction, the load current should immediately become a non-zero quantity thereafter; that is, the absolute value of the current through (or voltage across) the load should be of non-zero magnitude except at the zero crossing thereof. In the event that an arc occurs in series with the load and control-means system 10, the load current and/or load voltage will remain zero for a period of time until an arc re-ignition potential is reached. Thus, a potential arcing condition is detected by monitoring the load current and detecting if that current is still substantially of zero magnitude a short time after the load current zero crossing.

Accordingly, zero crossing detector 108 provides, at the collector electrode of transistor 118, a low logic level at each zero crossing, and provides a high logic level at all other times when the load is in operation and a non-zero load current flows. The leading edge of the low logic level waveform, at a zero crossing, triggers monostable multivibrator 125, to provide a short time delay thereafter. Illustratively, a 1 millisecond time delay is utilized, although a longer or shorter delay should be understood to be equally as well utilized. After the delay provided by monostable multivibrator, the $\overline{Q}$ output thereof rises to a logic 1 level and clocks into flip-flop 130 the level then present at the output of detector 108. As this clocking occurs at a certain time, e.g. 1 millisecond, after the zero crossing, the Q output level indicates that an arcing condition is present only if the voltage at the input of flip-flop 130 is still at a low logic level. Accordingly, the Q output of flip-flop 130 remains at a logic high level if no arcing occurs, but falls to a low logic level if arcing is present. The fall of the Q output voltage in the presence of arcing serves to trigger monostable multivibrator 135. The $\overline{Q}$ output of multivibrator 135 is normally at a logic 1 level, preventing resetting of the latch means 84 at the R' input thereof. In the event of an arcing condition, the triggering of multivibrator 135 causes the $\overline{Q}$ output thereof to fall to a logic 0 level for a time interval established by timing capacitance 137 and timing resistance 138. When the $\overline{Q}$ output falls to a low logic level, the low-logic-level-activating R' reset input of logic means 84 causes a low logic level to appear at latch output 84a. Responsive to the low level at output 84a, device 18a is removed from conduction, and the voltage across ramping capacitor 80 is clamped to a low level by action of diode 90. The removal of drive to device 18a and the clamping of capacitor 80 are both held for the duration of the low logic level $\overline{Q}$ output pulse, which pulse may be as long as desired, but must be greater than one-half cycle of the line waveform, e.g. greater than 1/120 of a second; an arbitrary pulse duration of 220 milliseconds was chosen for multivibrator 135. When the multivibrator times out, the latch is released and is again set, at the S input thereof, by the action of comparator 100 at the next line waveform zero crossing. The load current is again sampled at a time established by multivibrator 125 (e.g. 1 millisecond) after that zero crossing providing the new set S input signal; if the arcing condition has been extinguished, normal operation proceeds; if the arcing condition still exists, the latch second reset R' input again energized to prevent damage. Thus, as long as the arcing condition exists, the load current is reduced to a safe limit shortly after each load zero crossing at which an attempt to establish normal load operation occurs. Only when the arc is cleared will full load current flow through the load 11.

Referring now to FIG. 2a, if a system periodic clock CLK signal is available, as on line 150, the pair of monostable multivibrators 125 and 135 may be replaced by one or more digital counters for more reliable timing. Thus, the output, at the collector electrode of transistor 118, of zero crossing detector 108 is connected to the D input of flip-flop 130, and is also connected through an inverter 152 to the set S input of a set/reset flip-flop logic element 154. The $\overline{Q}$ output of flip-flop 154 is connected to the reset R input of a presettable counter 156, having a clock C input receiving the CLK pulses on line 150. The Q output of counter 156 is connected: to a preset-enable PE input thereof; to a reset R input of flip-flop 154; and to the clock C input of flip-flop 130. The protection circuit output signal at output 22b is taken from the Q output of flip-flop 30. The presettable counter preset inputs $P_0$-$P_N$ are configured, in known manner, by connection to ground or positive potentials, to provide a desired presettable count, which, in conjunction with the frequency of the CLK pulses on line 150, provides a desired time delay between the instant at which the reset R input is disabled and the Q output of counter 150 is enabled. Normally, the flip-flop 154 is in a reset condition and the $\overline{Q}$ output thereof is at a high logic level, resetting counter 156 and preventing counting therein; the clock C input of flip-flop 130 is at a low logic level, preventing clocking of the information at the D input therethrough to the Q output and the protection circuit output 22b.

At each load current zero crossing, the output of zero crossing detector 108 falls to a low logic level, providing a high logic level at the S input of flip-flop 154. Responsive thereto, the $\overline{Q}$ output of flip-flop 154 falls to a low logic level, removing the reset from counter 156 and enabling the counter to count the CLK pulses until the preset count is reached. Upon reaching the preset count, the Q output of counter 156 is enabled and performs the following actions: flip-flop 154 is reset, restoring the reset level at the R input of counter 156 and causing cessation of counting therein; the preset input PE is enabled in counter 156, to reload the preset count therein preparatory to another counting of the CLK pulses on line 150; and a high logic level is provided at the clock C input of flip-flop 130, at some time after a zero crossing. Therefore, at the time established by the clock pulse rate and the preset count in counter 150, the output level of the zero detector 108 then present at the D input of flip-flop 130 is clocked to the Q output thereof. If an arc exists, the Q output falls to a logic zero level and causes removal of drive to the switching device. If the output of zero detector 108 has returned to a high logic level, indicative of a non-arcing condition, the Q output of flip-flop 130 is at a high logic level and prevents the second resetting R' input of latch 84 from operating, enabling continued normal operation of the load.

Referring now to FIG. 3, another presently preferred embodiment of arc protection circuit 22" is illustrated for use with a digital form of control logic and gate drive means 20'. Means 20' utilizes the pair of comparators 38 and 42, with feedback resistances 138 and 142, respectively, and voltage dividers 40 and 44 as in the analog embodiment of logic means 20. Comparator output 38c is connected through an inverter 50 to the clock CLK input of an up/down U/D presettable counter 150. Inverter 50 causes the load resistance to be sensed after a current peak; removal of inverter 50 will cause sensing of load resistance to occur prior to a current peak. The preset-enabled PE input of counter 150 receives a power-on command POC signal (from means not shown) when the circuit is energized. Counter 150 is placed in the up-counting or down-counting mode responsive to the signal at an up/down U/D input, provided at the output of a two-input OR gate 152. One input of gate 152 is provided at comparator output 42c, while the other input is provided at the output of an N input OR gate 154. Each of the N inputs of "empty sense" gate 154 is connected to the connection of an associated $Q_m$ stage output of counter 150 and the associated $P_m$ presetting input of a unidirectionally-counting counter means 156; where $0 \leq m \leq N$. Counter 156 is a N+1 stage presettable up-counter, having the N+1-st presetting input $P_{N+1}$ connected to positive operating potential. The $P_N$ presetting input of the N stage up/down counter 150 is also connected to the positive operating potential +V, while the lesser significant inputs $P_O$–$P_{N-1}$ are all connected to common potential. A clock CLK input of counter 156 receives the output of a free-running oscillator means 158, comprised of a pair of inverters 158a and 158b, intercoupled by a pair of resistance elements 158c and 158d, and a timing capacitance 158e. The preset-enable PE input of counter 156 receives the switching device enabling signal, at output 20e', through a differentiator 160, comprised of a series differentiating capacitance 160a and a shunt resistance 160b to common potential. The most significant counting stage $Q_{N+1}$ output of counter 156 is provided at a control logic output 20'f.

A first control logic auxiliary input 20'g is connected to the reset R input of a type D flip-flop logic element 162, while a logic means second auxiliary input 20'h is connected to the data D input thereof. The logic means input 20b' is connected to the junction between auxiliary capacitor 16 and switching device 18, and is coupled through a clipping network 164, comprised of first and second series resistors 164a and 164b and a catching diode 164c from the junction thereof to positive potential, to the non-inverting input 166a of another comparator means 166. The third comparator inverting input 166b is connected to common potential, while the comparator output 166c is connected to the clock C input of flip-flop 162. If comparators 38, 42 and 166 are sufficiently fast-acting and produce sufficiently sharp-edged output transitions, the aforementioned connections may be directly provided. If sufficiently fast transitions are not provided at outputs 42c and 166c, Schmidt-trigger buffers 168 and 170 (shown in broken line, as optional) may be required, and inverter 50, if used, may have to be of the Schmidt-trigger type to speed up the transition of first comparator output 38c.

Control logic and gate drive means 20' may be operated without the arc protection circuit 22"', by connection of auxiliary output 20'f to first auxiliary input 20'g, by means of an inverter 172 (shown in dotted line) and by connection of the positive operating potential +V, by the broken line connection 174, to second auxiliary input 20'h. Operation is then basically as described for the digital embodiments of the aforementioned copending application Ser. No. 379,393, filed May 18, 1982. Briefly, the Q output of flip-flop 162 is set to the logic 1 level, turning on switching device 18, whenever a zero crossing is detected, at input 20b', by comparator 166. Switching device 18 remains conductive until flip-flop 162 is reset by the appearance of a counter 156 $Q_{N+1}$ pulse, at output 20'f. This level appears when counter 156 has been filled by counting up of the clock pulses from free-running oscillator 158, from an initial count entered by the pulse at the presetenabled PE input responsive to the start of the switching device gating pulse in each cycle. The preset count thus entered in counter 156 is determined by the $Q_m$ outputs of counter 150. The count in counter 150 is incremented or decremented by one count responsive to each clock pulse provided by first comparator 38, responsive in direction to the time at which the voltage across current sampling resistance 34 exceeds the reference voltage at the output of divider 44; thus the direction of counting is controlled by the load voltage applied to comparator 42. Counter 150 never enters the "full" state. If counter 150 is at the "empty" state, an additional down count would suddenly change the state thereof to "full"; this condition is sensed by gate 154 and additional down counting prevented thereby.

For use with the arc protection circuit 22"' of the present invention, control logic means 20' provides additional output 20'i, connected to the input of gate 152 from comparator 42. Arc protection circuit 22' includes a zero crossing detector 108' utilizing a comparator 180, having the inverting input 180a thereof connected to common potential. The non-inverting input 180b is connected to first means line input 20a' through a series diode 182 and series first and second resistance elements 184 and 186. Another resistance element 188 is connected from the junction of resistance elements 184 and 186 to the output of a voltage divider 190, comprised of first and second resistance elements 190a and 190b connected in series between positive operating potential +V and common potential. The comparator output 180c is connected through an inverter 192, which may be a Schmidt-type inverter if necessary for providing sufficiently fast transitions in the change of state of the comparator output. Inverter output 192 is connected through a low-pass filter 194, comprised of a series resistance 194a and a shunt capacitance 194b, to control logic second auxiliary input 20'h (the connection 174 thereto being broken when operated with arc protection circuit 22"'). Inverter output 192 is also connected through a second inverter 196 to the clock C input of a type D flip-flop 198, having a reset R input connected to logic means second auxiliary output 20'i. The flip-flop data D input is connected to positive operating potential +V. The flip-flop $\overline{Q}$ output is connected to one input of a two-input NAND gate 200, having its remaining input connected to logic means first auxiliary output 20'f. The output of gate 200 is connected to logic means first auxiliary input 20'g and thence to the reset R input of flip-flop 162 (with the inverter 172 between output 20'f and input 20'g being removed when operating with arc protection circuit 22"').

In operation, as a load voltage and current zero crossing is approached with line $L_1$ more positive than line $L_2$, diode 18b is normally conducting and switching device 18a is in the "off" condition. Circuit terminal 20a' is more positive than common potential, whereby diode 182 conducts and comparator output 180c is at a relatively more-positive level. Due to a small positive offset voltage provided primarily by voltage divider 190, the comparator output 180c voltage does not fall until the voltage at terminal 20a' is somewhat more-negative than common potential. At such time, with a negative polarity voltage across the load from line $L_1$ with respect to common potential, the output of inverter 192 abruptly rises and provides a logic 1 level at the D input of flip-flop 162. Shortly thereafter, the third comparator output 166c provides a rising voltage edge, responsive to the load voltage and current zero crossing, which clocks the logic 1 level at the D input of flip-flop 162 through to the Q output thereof, to turn on switching device 18a, as long as a logic 1 level is not present at the reset R input of flip-flop 162. Thus, for normal operation, the output of gate 200 must be at a logic 0 level, responsive to each of the gate 200 inputs being at a logic 1 level. A logic 1 level is provided at output 20'f by providing a normal $Q_{N+1}$ logic 1 resting level, responsive to presetting the N+1 stage of counter 156 thereto with a logic 1 level (the operating potential +V) at input $P_{N+1}$. A logic 1 level is provided at the $\overline{Q}$ output of flip-flop 198 by providing a logic 1 level at the reset R input thereof prior to the zero crossing. This reset logic 1 level is obtained from second comparator output 42c, during the previous, positive-polarity load half-cycle.

After the foregoing sequence provides a logic 1 level at the Q output of flip-flop 162 and turns on switching device 18a, the normal sequence of operation causes counter 156 to be counted up toward the full state. When the full state is reached and exceeded, output $Q_{N+1}$ falls to the logic 0 level, to provide a logic 1 level at input 20'g, resetting the Q output of flip-flop 162 to the logic 0 level and turning off switching device 18a. Thus, the normal time interval for conduction through device 18a is established.

In the event of an arc during conduction of device 18a, the voltage at terminal 20a' will remain at zero after the negative-going zero crossing thereof and the output of fourth comparator 180c will revert to a more positive level. The voltage at the output of inverter 196 will thus rise and appear as an actuating edge at the clock C input of flip-flop 198. The logic 1 level at the data D input thereof is clocked through the flip-flop, causing the $\overline{Q}$ output of flip-flop 198 to fall to a logic 0 level, providing a logic 1 level at input 20'g and the reset input of flip-flop 162. Responsive to this logic 1 level, the Q output of flip-flop 162 is reset, removing drive from switching device 18a and protecting the switching device and load. Similarly, the voltage at the clock C input of flip-flop 198 will rise due to other forms of interruption, terminating the drive pulse to switching device 18a and protecting that device 18a and the load. The switching device remains off, as an actuating logic 1 reset level is provided to the reset R input of flip-flop 198 during the load negative-half-cycle, and another attempt to turn switching device 18a is not attempted until the zero crossing terminating the positive half-cycle following that negative half-cycle, i.e. almost a full source waveform cycle later. If the arc or other interrupting condition has been terminated, a logic 0 level will then appear at the output of gate 200 and normal operation will recommence. If the arc or other interruption is still present, input 20'g receives a logic 1 level, keeping flip-flop 162 in the reset condition and preventing drive from being applied to switching device 18a.

While several presently preferred embodiments of my arc protection circuit for capacitive ballast have been described in detail herein, many modifications and variations will now become apparent to those skilled in the art. It is my intent, therefore, to be limited only by the scope of the appending claims and not by the specific details and instrumentalities described by way of illustration herein.

What is claimed is:

1. A load protection circuit for use with a ballast having, across an A.C. source, a capacitive element in series with a substantially resistive load and a switching device, comprising:
   means for detecting a load current zero crossing; and
   means for sampling the magnitude of current flowing through said load at a time after the detected load current zero crossing, and for disabling said switching device to prevent substantial load current flow therethrough only if said load current magnitude is of substantially zero magnitude when sampled.

2. The protection circuit of claim 1, wherein said sampling and disabling means comprises: means for sampling the magnitude of load current at a predetermined time after each detected zero crossing; and means responsive to a sampled load current flow of substantially zero magnitude for disabling said switching device.

3. The protection circuit of claim 2, wherein said sampling means comprises: a first monostable multivibrator providing an output pulse commencing at said load current zero crossing and terminating after said predetermined time interval; and a sampling element having an output with first and second states responsive respectively to a substantially zero and a substantially non-zero load current magnitude at a first input, responsive to the termination of said first multivibrator output pulse at a second input.

4. The protection circuit of claim 3, wherein said sampling element is a D-type flip-flop.

5. The protection circuit of claim 3, wherein said first monostable multivibrator time duration is not greater than about 1 millisecond.

6. The protection circuit of claim 3, wherein said disabling means is a second monostable multivibrator providing a pulse of predetermined duration for disabling said switching means, responsive to the sampling element first output state.

7. The protection circuit of claim 6, wherein said load operates at line frequency and said disabling pulse is of at least the time duration of one-half of the line source waveform cycle.

8. The protection circuit of claim 1, wherein said sampling and disabling means comprises: a first flip-flop having an output thereof set to a first level responsive to the detection of said load current zero crossing, and having a resetting input for resetting the state of said output to another level; counter means for providing an output signal only after counting a presettable number of periodic clock signal pulses and having a reset input inhibiting counting when receiving said another level from said first flip-flop; said first flip-flop output being reset to said another level responsive to each counting means output signal; and a second flip-flop having an output, a first input receiving a load current magnitude signal, and a second input receiving said counter means output signal for providing a switching means disabling signal at said second flip-flop output whenever the second input signal indicates a substantially zero load current magnitude is present when said first input receives said counter means output signal.

9. The protection circuit of claim 1, wherein said zero crossing detector includes: a source of operating potential, with respect to a common potential; a first resistance element having a first terminal connected to said operating potential, and a second terminal; first and second transistors each having a collector electrode connected together and to the first resistance element second terminal, each of said first and second transistors having a second electrode connected to common potential and a third electrode receiving a signal representative of the load current magnitude; and a solid-state device receiving the signal at the first resistance element second terminal for providing a detecting means output signal having a first state when said load current is at a substantially zero magnitude and another state for all other magnitudes of load current.

10. The protection circuit of claim 9, wherein said first transistor base electrode and second transistor emitter electrode receive said load current magnitude signal, and said first transistor emitter electrode and second transistor base electrode are connected to common potential.

11. The protection circuit of claim 9, wherein said solid-state device is a transistor having a base electrode connected to said first resistance element second terminal, an emitter electrode connected to said common potential and a collector electrode at which said detecting means output signal is present; and a second resistance element connected between said third transistor collector electrode and said operating potential source.

12. The protection circuit of claim 1, wherein said zero crossing detector includes: a comparator having a first input, a second input coupled to a reference potential, and an output providing an output signal in respectively a first state and a second state when the magnitude of a signal at said first input is respectively greater and less than the magnitude of the reference potential at said second input; a unidirectionally conducting element receiving the load current waveform; and a network connected between said unidirectionally-conducting element and said first input for causing the comparator output to switch states at a predetermined point on the load current waveform after a zero-crossing thereof.

13. The protection circuit of claim 12, wherein said sampling and disabling means comprises: a flip-flop having an output settable to first and second states responsive respectively to a signal at a first input and to a signal edge of predetermined polarity at a second input; said flip-flop first input receiving an enabling signal prior to the time at which said predetermined waveform point is reached, to provide said first output level to prevent disablement of said switching device; and means for providing said second input with said predetermined polarity edge after said zero crossing only if said load current remains at a substantially zero magnitude.

14. The protection circuit of claim 13, wherein said edge providing means includes means cooperating with said network for offset biasing said comparator first input to a level to cause said comparator output to change in said predetermined polarity direction only if a substantially zero load current flows at said predetermined point after said load current waveform zero crossing.

* * * * *